(12) United States Patent  (10) Patent No.: US 8,184,168 B2
Kindborg et al.  (45) Date of Patent: May 22, 2012

(54) METHOD AND APPARATUS FOR CONFIGURING PARAMETER VALUES FOR CAMERAS

(75) Inventors: Mattias Kindborg, Malmö (SE); Hans Olsen, Malmö (SE); Michael Reichenauer, Malmö (SE)

(73) Assignee: Axis AB, Lund (SE)

( * ) Notice: Subject to any disclaimer, the term of this patent is extended or adjusted under 35 U.S.C. 154(b) by 674 days.

(21) Appl. No.: 11/771,687

(22) Filed: Jun. 29, 2007

(65) Prior Publication Data

US 2008/0122949 A1 May 29, 2008

Related U.S. Application Data

(60) Provisional application No. 60/830,963, filed on Jul. 14, 2006.

(30) Foreign Application Priority Data

Jul. 3, 2006 (EP) .................................... 06116500

(51) Int. Cl.
 H04N 5/232 (2006.01)
(52) U.S. Cl. ............................. 348/211.11; 348/231.99
(58) Field of Classification Search ............. 348/231.99, 348/211.11
 See application file for complete search history.

(56) References Cited

U.S. PATENT DOCUMENTS

| | | | |
|---|---|---|---|
| 4,626,893 A * | 12/1986 | Yamanaka | .................... 348/176 |
| 5,331,413 A | 7/1994 | Diner | |
| 5,517,236 A | 5/1996 | Sergeant et al. | |
| 6,208,379 B1 * | 3/2001 | Oya et al. | ................. 348/211.11 |
| 6,750,913 B1 | 6/2004 | Noro et al. | |
| 6,856,346 B1 * | 2/2005 | Kobayashi et al. | ....... 348/211.99 |
| 6,909,457 B1 * | 6/2005 | Fukasawa | ................ 348/211.11 |
| 6,919,921 B1 * | 7/2005 | Morota et al. | ........... 348/211.11 |
| 6,943,829 B2 | 9/2005 | Endo et al. | |
| 2003/0128277 A1 * | 7/2003 | Tanaka | ....................... 348/211.9 |
| 2003/0234866 A1 | 12/2003 | Cutler | |
| 2004/0080618 A1 | 4/2004 | Norris et al. | |
| 2005/0190263 A1 | 9/2005 | Monroe et al. | |
| 2005/0225662 A1 * | 10/2005 | Tsuda et al. | .................. 348/360 |
| 2006/0012682 A1 | 1/2006 | Lin | |
| 2006/0056733 A1 * | 3/2006 | Minakuti et al. | .............. 382/286 |
| 2006/0061664 A1 | 3/2006 | Ito | |

FOREIGN PATENT DOCUMENTS

| | | |
|---|---|---|
| EP | 1331808 A1 | 7/2003 |
| EP | 1377026 A2 | 1/2004 |
| EP | 1 581 003 | 9/2005 |
| GB | 2 343 810 | 5/2000 |

(Continued)

*Primary Examiner* — Usman Khan
(74) *Attorney, Agent, or Firm* — Volpe and Koenig, P.C.

(57) ABSTRACT

A method for configuring parameter values for a plurality of cameras (100a-100f) is disclosed. In the first step of the method, image data from the plurality of cameras (100a-100f) is acquired. Secondly, the image data from the plurality of cameras (100a-100f) is buffered. Thirdly, the buffered image data from the plurality of cameras (100a-100f) is displayed. Fourthly, at least one parameter value for a first subset of said plurality of cameras is changed. Fifthly, the at least one parameter value is transmitted to said first subset of cameras. Sixthly, the changed image data from a second subset of said plurality of cameras is acquired. Seventhly, the buffered image data for said second subset of cameras is replaced with said changed image data for said second subset of cameras. Finally, the stored image data for said plurality of cameras (100a-100f) is displayed.

18 Claims, 8 Drawing Sheets

FOREIGN PATENT DOCUMENTS

| | | |
|---|---|---|
| GB | 2 360 898 | 10/2001 |
| JP | 8098086 A2 | 4/1996 |
| JP | 10178631 A2 | 6/1998 |
| JP | 2002010380 A2 | 1/2002 |
| JP | 2002251608 A2 | 9/2002 |
| JP | 2004007580 A2 | 1/2004 |
| JP | 2006115435 A2 | 4/2006 |
| WO | 0209060 A2 | 1/2002 |
| WO | 03041411 A1 | 5/2003 |

* cited by examiner

METHOD AND APPARATUS FOR CONFIGURING PARAMETER VALUES FOR CAMERAS

CROSS REFERENCE TO RELATED APPLICATION

This application is claims the benefit of provisional application No. 60/830,963 filed on Jul. 14, 2006, which is incorporated by reference as if fully set forth.

FIELD OF INVENTION

The present invention generally relates to a method for configuring parameter values for a plurality of cameras, an apparatus comprising a processing device, a display adapted for showing image data, an input device, a memory adapted for holding a number of parameter values and for buffering image data, and a data communication interface adapted for communication through a data communications network with a plurality of cameras, a method for parameter value configuration of a camera, a camera having a processor device, a memory adapted for holding a number of parameter values, and a data communication interface adapted for communication through a data communications network, said camera stores parameter values which control the appearance of image data captured by said camera, a system for configuration of at least one parameter value in a plurality of cameras, comprising a camera and an apparatus, and a computer program.

BACKGROUND

A modern security system often comprises a number of surveillance cameras. The surveillance cameras give the security personnel a possibility to monitor a large area, such as several floors in an office building.

When having a number of cameras, the appearance of the images from the number of cameras should preferably be substantially similar with respect to brightness, sharpness, etc., since this makes the work of the operator less tiresome. More particularly, for a human eye, it is less tiresome analysing a number of images having similar appearance, than analysing a number of images with dissimilar appearance.

When having a number of cameras, the cameras are most often placed at different places having different light conditions, which makes predetermined settings a non-optimal alternative. Further, the number of cameras may be different types of cameras with, for example, different types of image sensors, which even further make predetermined settings a non-optimal alternative.

US 2003/0234866A1 describes a practical real-time calibration of digital omnidirectional cameras in the areas of de-vignetting, brightness, contrast and white balance control. Novel solutions for the colour calibration of an omnidirectional camera rig, and an efficient method for devignetting images are also presented. Additionally, a context-specific method of stitching images together into a panorama or a mosaic is provided.

SUMMARY

In view of the above, an objective of the invention is to solve or at least reduce the problems discussed above. In particular, an objective is to provide a method for configuring parameter values for a plurality of cameras, wherein an image feedback is provided after a reconfiguration of the parameter values.

The plurality of cameras may be all the cameras connected to a certain data communications network, but may also be a subset of cameras connected to the data communications network.

Image data generated by the cameras may be analog or digital, but preferably digital. Further, the image data may be still pictures, as well as video sequences. In one embodiment, the plurality of cameras generate video sequences normally, but still pictures as image feedback.

A first aspect of the invention is a method for configuring parameter values for a plurality of cameras, comprising acquiring image data from said plurality of cameras, said cameras store parameter values which control the appearance of image data captured by said cameras, buffering said image data from said plurality of cameras, displaying said buffered image data from said plurality of cameras, changing at least one parameter value for a first subset of said plurality of cameras, transmitting said at least one changed parameter value to said first subset of cameras to allow update of said at least one parameter value in each camera in said first subset, acquiring changed image data from a second subset of said plurality of cameras comprising at least the cameras of the first subset, replacing said buffered image data for said second subset of cameras with said changed image data for said second subset of cameras, and displaying said buffered image data for said plurality of cameras.

An advantage with this first aspect is that an image feedback is given after changing the parameter values. In this way the user of an apparatus, configured to perform the steps according to the method of the first aspect, will easily see if the change of parameter values produced the desired result or not.

The first subset of the method may be a part of the second subset.

Alternatively, the first subset may be equal to the second subset.

Alternatively, the second subset may be equal to the plurality of cameras.

The changing may involve receiving a user input from a user, and changing said at least one parameter value in accordance with said user input.

An advantage of this is that the user of the apparatus, performing the steps of the method according to the first aspect, may determine for himself in which way the parameter values is to be changed.

Alternatively, the changing may involve determining reference image data, calculating a correction value based on said reference image data, and changing said at least one parameter value in accordance with said correction value.

An advantage of this is that no user interaction is required, which implies that the configuration of the parameter values may be made quickly.

The step of acquiring image data according to the first aspect of the invention may involve transmitting an image data request to said plurality of cameras.

The method according to the first aspect may further involve retrieving at least one parameter value from a predetermined set of parameter values.

An advantage of this is that a number of sets of predetermined parameter values for different environments may be provided to the user of the apparatus, performing the steps according to the method of the first aspect, wherein each such set of predetermined parameter values will function as a selectable template. In this way a first approximation of suitable parameter values may be easily and quickly done by the user of the apparatus by selecting the desired set of predetermined parameter values.

The set of predetermined parameter values may be selected from a group consisting of, but not limited to: a set of predetermined parameter values adapted for outdoor conditions, a set of predetermined parameter values adapted for indoor conditions, a set of predetermined parameter values adapted for fluorescent lighting conditions, a set of predetermined parameter values adapted for incandescent light conditions and a set of predetermined parameter values adapted for infrared light conditions.

The step of retrieving may further involve receiving a user input from a user, and retrieving said set of predetermined parameter values in accordance with said user input.

The at least one parameter value may be selected from a group consisting of, but not limited to: a white balance value, a contrast value, a rotation value, a compression value, a sharpness value and a colour balance value.

Further, the parameter values may be acquired together with said image data from said plurality of cameras in said acquiring of image data and are displayed in said displaying of image data together with said image data.

Moreover, acquiring of said image data, buffering of said image data, displaying of said image data, changing of at least one parameter value for said first subset, transmitting of said at least one parameter value, acquiring of changed image data from said second subset, replacing of said buffered image data for said second subset, and displaying of said buffered image data, may be repeated iteratively until a user acceptance signal is received from a user.

A second aspect of the invention is an apparatus comprising a processing device, a display adapted for showing image data, an input device, a memory adapted for holding a number of parameter values and for buffering image data, and a data communication interface adapted for communication through a data communications network with a plurality of cameras, wherein the processing device being adapted to acquire image data from said plurality of cameras, buffer said image data from said plurality of cameras in said memory, display said buffered image data from said plurality of cameras on said display, change at least one parameter value for a first subset of said plurality of cameras based upon an actuation of said input device, transmit said at least one parameter value to said first subset of cameras through said data communications network, to allow update of said at least one parameter value in each camera in said first subset, acquire changed image data from a second subset of said plurality of cameras through said data communications network, replace said buffered image data for said second subset of cameras with said changed image data for said second subset of cameras in said memory, and display said buffered image data for said plurality of cameras on said display.

The apparatus according to the second aspect may comprise a personal computer (PC).

An advantage of this is that any PC connected to a LAN (Local Area Network) to which a plurality of cameras is connected may be used as the apparatus according to the second aspect of the invention.

The apparatus according to the second aspect may alternatively comprise a mobile terminal.

The apparatus according to the second aspect of the invention may be adapted to perform the method according to the first aspect of the invention.

A third aspect of the invention is a method for parameter value configuration of a camera coupled to an apparatus through a data communications network, said camera stores parameter values which control the appearance of image data captured by said camera, whereby the steps, in said camera, of receiving an image data request from said apparatus, generating image data, using said parameter values, upon receiving said image data request, transmitting said image data to said apparatus, receiving a parameter value change request from said apparatus, changing at least one parameter value among said parameter values held in said camera based upon said parameter value change request, generating, using said parameter values as changed, changed image data, and transmitting said changed image data to said apparatus through said data communications network.

A fourth aspect of the invention is a camera having a processing device, a memory adapted for holding a number a parameter values, and a data communication interface adapted for communication through a data communications network, said camera stores parameter values which control the appearance of image data captured by said camera, whereby the processing device being adapted to receive an image data request from an apparatus through said data communications network, generate image data, using said parameter values, upon receiving said received image data request, transmit said image data to said apparatus through said data communications network, receive a parameter value change request from said apparatus through said data communications network, change at least one parameter value among said parameter values held in said memory in accordance with said parameter value change request, generate, using said parameter values as changed, changed image data, with said parameter values being changed, upon said parameter value change request, and transmit said changed image data to said apparatus through said data communications network.

A fifth aspect of the invention is a system for configuration of at least one parameter value in a plurality of cameras, comprising a data communications network, an apparatus according to the fourth aspect, connected to said data communications network, and a plurality of cameras configured for communication with said apparatus through said data communications network.

A sixth aspect of the invention is a computer program, comprising computer program code for performing the steps of the method according to the first aspect.

The third to sixth aspects of the invention may have substantially the same or corresponding features, whenever applicable, as the first and second aspects.

Other objectives, features and advantages of the present invention will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one in-stance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF THE PREFERRED EMBODIMENTS

A General Surveillance Camera System

Figure 1:
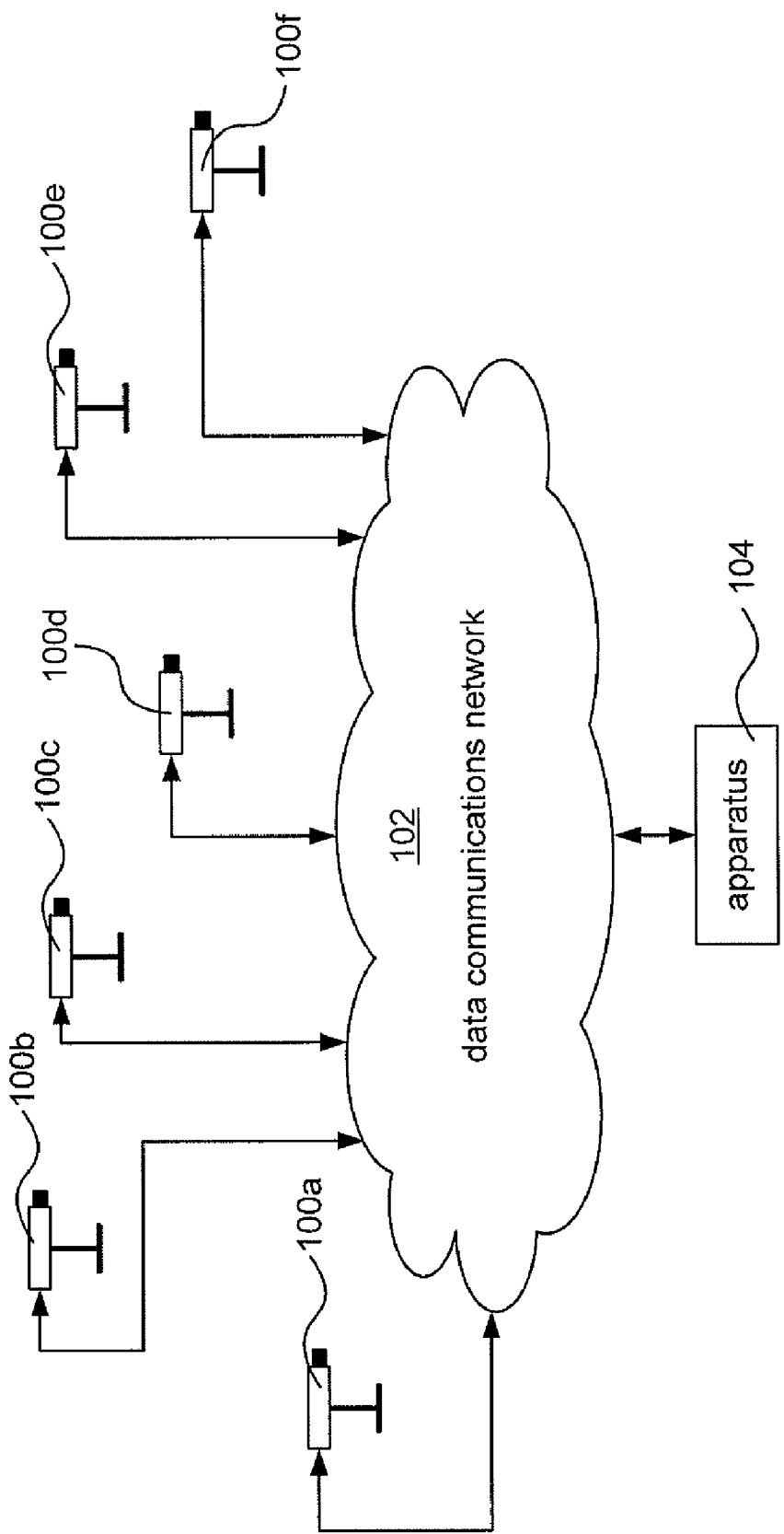
FIG. 1 illustrates a general surveillance camera system comprising a plurality of cameras, a data communications network and an apparatus.

FIG. 1 illustrates a general surveillance camera system with a plurality of cameras 100a-100f. Each camera is connected to a data communications network 102, such as a TCP/IP-based Local Area Network (LAN) or a TCP/IP-based Wireless Local Area Network (WLAN). An apparatus 104 for receiving and presenting image data from the cameras 100a-100f is also connected to the data communications network.

Although it is a great advantage to use an established standard such as the TCP/IP, this is not a must. Actually, any data communications network adapted to pass information, analog as well as digital, from cameras to an apparatus may be utilised for realising the present invention.

Moreover, the apparatus 104 can also be utilised for configuring the parameter values for each camera 100a-100f. This may, for instance, be to set the sharpness value for each of the camera to an appropriate value.

In FIG. 1, only one apparatus is shown. It is only required one apparatus to realise the invention, however, there may be more than one apparatus present.

The Camera

Figure 2:
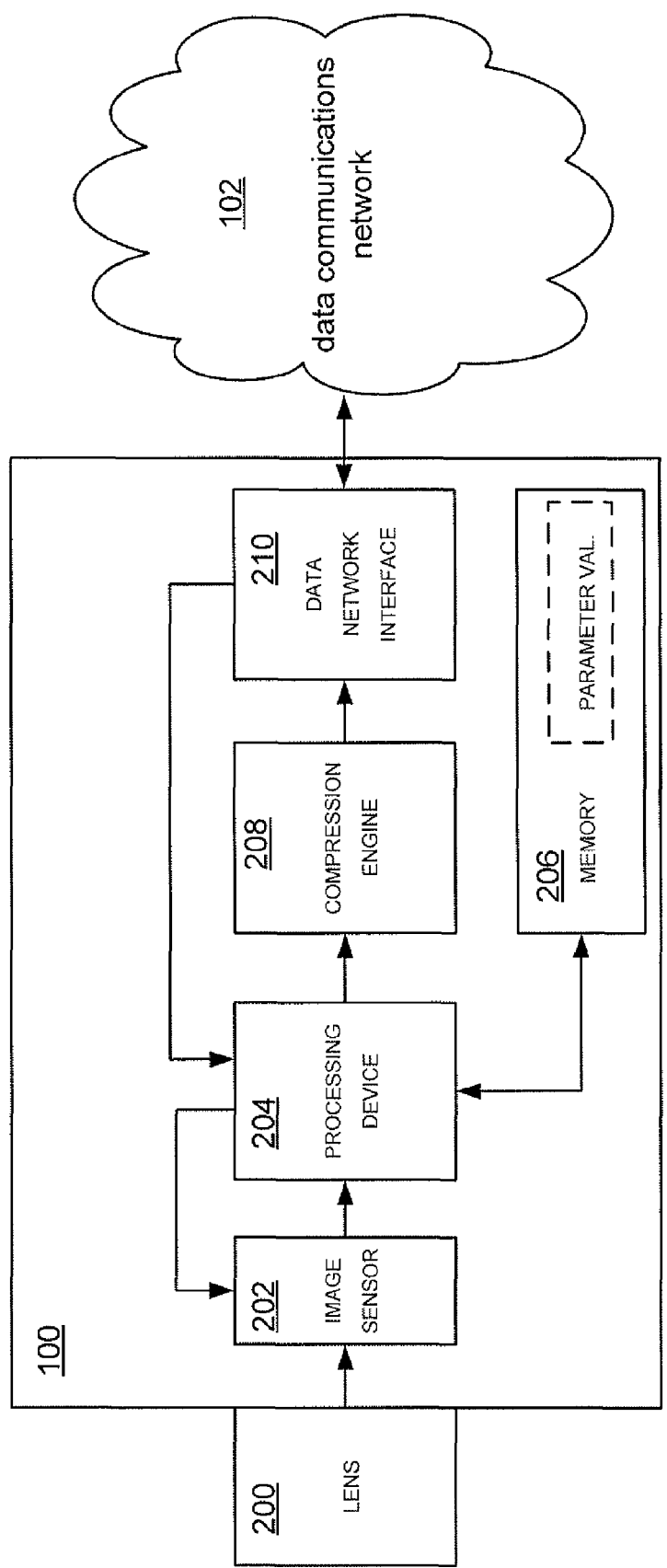
FIG. 2 illustrates one of the plurality of cameras in the general surveillance camera system in more detail.

FIG. 2 illustrates one of the cameras 100a-100f connected to the data communications network 102 shown in FIG. 1 in more detail.

The camera 100 comprises a lens 200, an image sensor 202, a processing device 204, a memory 206, a compression engine 208 and a data communication interface 210.

The lens 200 comprises optics adapted to focus incoming light onto the image sensor. Further, a number of associated devices for controlling the incoming light may be associated to the lens 200, such as a shutter for adjusting the amount of light and an exposure time control device for controlling the exposure time of the camera. Hereinafter, when referring to the lens 200 the associated devices should be included as well.

Generally, light is transferred via the lens 200 to the image sensor 202. In the image sensor 202, an image is captured by generating image data which is thereafter transferred to the processing device 204. The processing device 204 can be one or several processors adapted to process the image data generated by the image sensor 202. Such processing can be motion detection, adding a time stamp to the present image data, and changing the parameter values of the image sensor 202. The processing device can, for instance, be an ETRAX 100LX 32-bit ASIC which is made commercially available by AXIS Communications AB.

Further, the memory 206 is utilised by the processing device 204, e.g. for storing parameter values. The memory can be divided into a RAM memory and a Flash memory.

Thereafter, the image data is transferred to the compression engine 208. In the compression engine the image data is compressed in accordance with a compression format, such as MPEG-4 or Motion-JPEG.

Finally, the compressed image data is output to the data communications network 102 via the data communication interface 210. The data communication interface can be Ethernet-compliant in the physical form of an RJ-45 connector.

Additionally, the camera 100 is adapted to receive new parameter values via the data communications network 102 utilising the data network interface 210. After having received new parameter values the present parameter values stored in the memory 206 can, by using the processing device 204, be replaced by the received new parameter values.

Moreover, the camera comprises some sort of power supply (not shown), such as a battery, or is connected to the mains via an electric cable or via an electric cable comprised within an Ethernet cable (known as Power over Ethernet (IEEE 802.3af)).

The Apparatus

Figure 3:
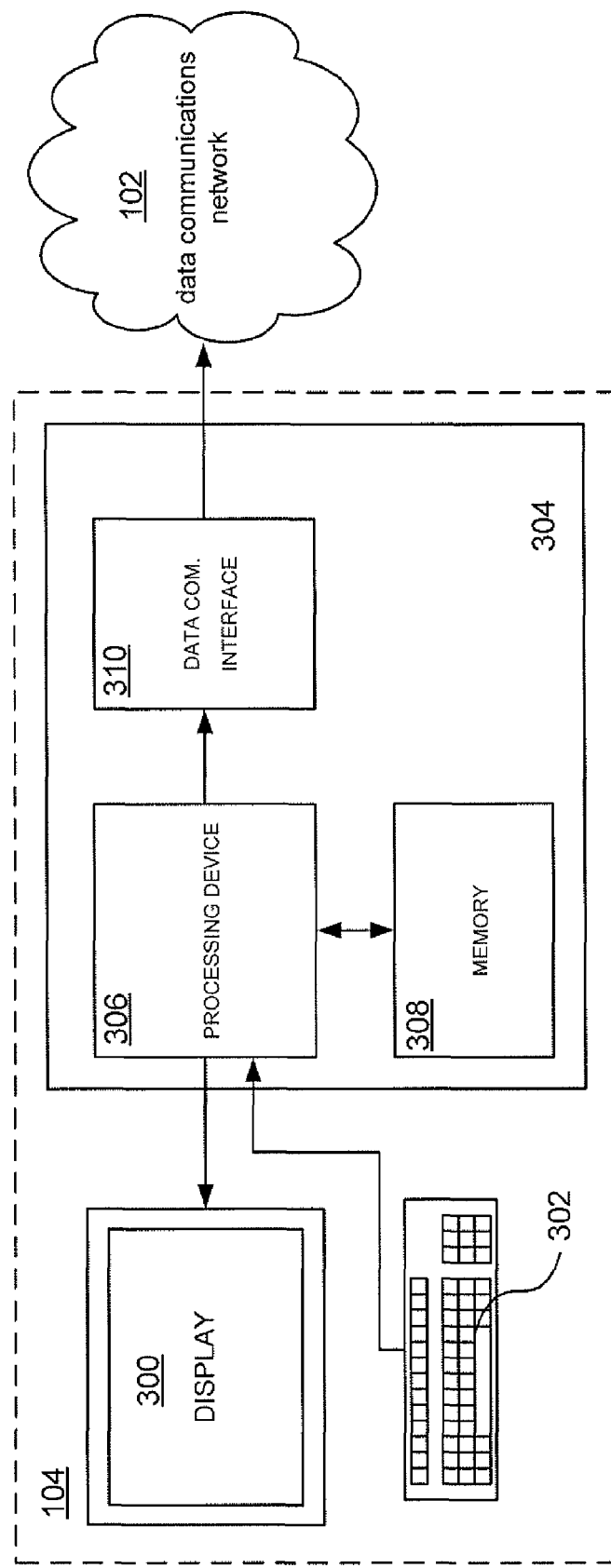
FIG. 3 illustrates the apparatus in the general surveillance camera system in more detail.

The apparatus 104 connected to the data communications network 102 is further illustrated in FIG. 3.

In FIG. 3, the apparatus 104 is illustrated as a PC generally comprising a display 300, an input device 302, illustrated as a keyboard, and a computing unit 304, wherein the computing unit 304 further comprises a processing device 306, a memory 308 and a data communication interface 310 communicating with the data communications network 102.

Data is received from and transmitted to the data communications network 102 via the data communications interface 310, which can be similar to the data communication interface 210 of the camera 200.

The received data is transferred to the processing device 306, in which the data is processed. This processing can comprise, if the received data is image data from the camera 300, transferring the received image data to the display 300.

Data can also be received by the processing device 306 from the input device 302. Such data can, for instance, be data describing changes, or new values, of the camera parameter values, input by the user of the input device 302 to be transferred through the data communications network 102 to the camera 100.

Although the apparatus 104 is illustrated as a PC, the apparatus can, in another embodiment, be a mobile terminal, a PDA or any other device having a display and processing capabilities.

As an alternative to the wire-based keyboard illustrated in FIG. 3, the input device 302 can communicate wirelessly with the computing unit 304. For instance, the input device 302 can be embodied as a remote control communicating with a computing unit 304 via IR light.

In another embodiment, the input device 302 can be a mobile terminal communicating with the computing unit 304 via a mobile terminal communications network, such as a GSM network. In this embodiment, a mobile terminal network communications interface may have to be added to the computing unit 304.

An Alternative Approach

An alternative approach, based on that the changes are made in the cameras 100a-100f, is that the apparatus 104 can be divided into an input sub-apparatus and an output sub-apparatus.

The input sub-apparatus can be a mobile terminal, which communicates directly with the cameras 100a-100f via a mobile terminal communications network, such as a GSM network, which implies that a mobile terminal network communications interface have to be added to the cameras 100a-100f.

The output sub-apparatus can be a TV set, or other suitable equipment, adapted to show image data from a number of cameras simultaneously, which TV set is adapted to receive image data broadcasted from the cameras 100a-100f, which implies that a broadcasting interface is, in this alternative approach, added to each of the cameras 100a-100f.

In order to relate the information transmitted from the input sub-apparatus to a specific function, references are added in the image data shown by the output sub-apparatus.

The Graphical User Interface of the Apparatus

Figure 4:
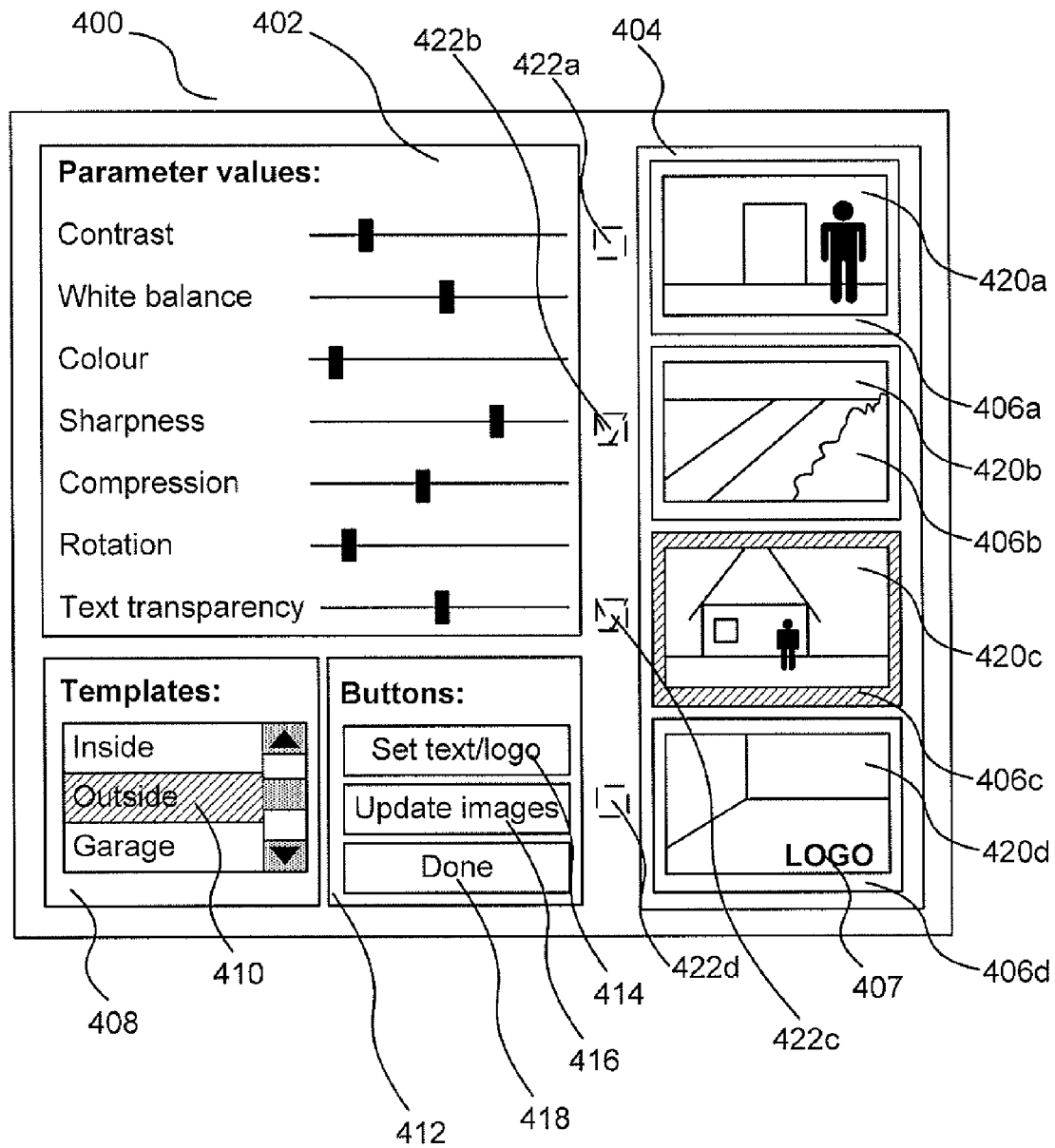
FIG. 4 illustrates a graphical user interface of the apparatus.

FIG. 4 illustrates an example of a Graphical User Interface (GUI) 400 of the apparatus according to the present invention.

The GUI comprises a parameter values part 402. In this part, the available parameter values are indicated, and a control button for each of the parameter values is available for adjustment of the respective parameter values. In this example, the control button is embodied as a slider, where the rightmost position implies a high parameter value and the leftmost position implies a low parameter value.

In an image data part 404, the image data from a number of cameras is shown simultaneously. In this example, image data from four different cameras is shown in four different image data areas 420a, 420b, 420c, 420d.

For instance, the image data areas 420a, 420b, 420c, 420d may represent image data from the cameras 100a, 100b, 100c and 100d, respectively.

A frame 406a, 406b, 406c, 406d can be placed around each of the image data areas 420a, 420b, 420c, 420d. The image data area can be activated 420c, illustrated in the figures with dashed lines, or deactivated 420a, 420b, 420d. When an image data area 420c is activated, the changes made in the parameter values part 402 will be applied to the camera represented by this activated image data area 420c when the new parameter values are transmitted to the cameras.

The image data may comprise a text or symbol 407, such as company name or a logo. The text 407 can be added to the image data by a user. When the text 407 is added to the image data from a specific camera, it can be shown in the image data part 404.

Advantageously, the text 407 is stored in the memory 206 of the camera 100. In this way, regardless of which apparatus that is used for displaying the image data, the text will be shown. Further, the transparency of the text or logo may be one of the parameter values.

Further, an update image data checkbox 422a, 422b, 422c, 422d may be associated to each of the image data areas 420a, 420b, 420c, 420d. When the checkbox is activated 422b, 422c the image data in the associated image data area 420b, 420c is set to be updated with new image data when new image data is requested, i.e. the cameras corresponding to the image data areas 420b, 420c are set to belong to a second subset of cameras which will be further described in FIGS. 6, 7, 8 and 9.

Advantageously, since an image feedback most often is preferred after having changed the parameter values, the checkbox 422c may be automatically activated when the frame 420c around a certain image data area 406c is activated.

In order to facilitate and improve the parameter values, a number of templates, i.e. a set of parameter values for a certain environment, is available. The templates are presented in a template area 408, and a current template 410 can be indicated as darker than the rest of the templates.

A button area 412 comprising a "set text/logo" button 414, an "update images" button 416 and a "done" button 418 is presented.

The "set text/logo" button 414 is utilised for setting the text or the logo 407. When the button 414 is pressed a new window can be shown, where a set of tools is presented for creating a text or logo, or a dialog box can be shown where a file containing a text or logo can be chosen and thereafter be set as the text or logo 407. After the text or logo 407 has been created or chosen, it may be stored temporarily in the apparatus 104 in order to be transmitted to the camera/cameras 100a-100f together with the parameter values. Alternatively, the text or logo 407 is transmitted instantly to the camera/cameras 100a-100f.

The "update images" button 416 is utilised for updating the parameter values in the camera/cameras 100c corresponding to the activated frame/frames 406c and for downloading new image data from the camera/cameras 100b, 100c corresponding to the activated update image data checkboxes 422b, 422c.

More specifically, in a first step, the new parameter values, which are set with the sliders in the parameter values part, are transmitted to the camera/cameras being indicated via the frames 406a-406d. Next, the new parameter values are received by the camera/cameras and the present parameter values stored in the memory of the camera 206 are replaced by the received new parameter values. In the case illustrated in FIG. 4, only the parameter values in the camera 100c is indicated to be updated.

In a second step, new image data is retrieved from the cameras being indicated via the update image checkboxes 422b, 422c. For instance, this may be made by sending an image request to the indicated camera/cameras, in this case the cameras 100b, 100c.

In this way, when a parameter value change is made, the "update images" button 416 can be pressed, and a result of the parameter value change is shown. Hence, an image feedback is automatically given for every change, which is an advantage. Moreover, image feedback may be given for every chosen camera connected to the data communications network, which means that if the appearance of the image data for a number of cameras is not similar, this will easily be noticed by the user.

An appropriate way to work is to first set a template to each of the cameras, e.g. the two middlemost image data areas 420b, 420c in FIG. 4 present image data from an outdoor environment and are hence related to a template corresponding to the an outdoor environment. Thereafter, based on the outdoor environment template, a fine adjustment of the parameter values can be made manually by adjusting the parameter value slides in the parameter values part 402.

When the image data areas 420a, 420b, 420c, 420d are considered to have a similar appearance, the "Done" button 418 is pressed, which can be seen as a user acceptance signal.

A General Method for Configuring Parameter Values for a Number of Cameras

Figure 5:
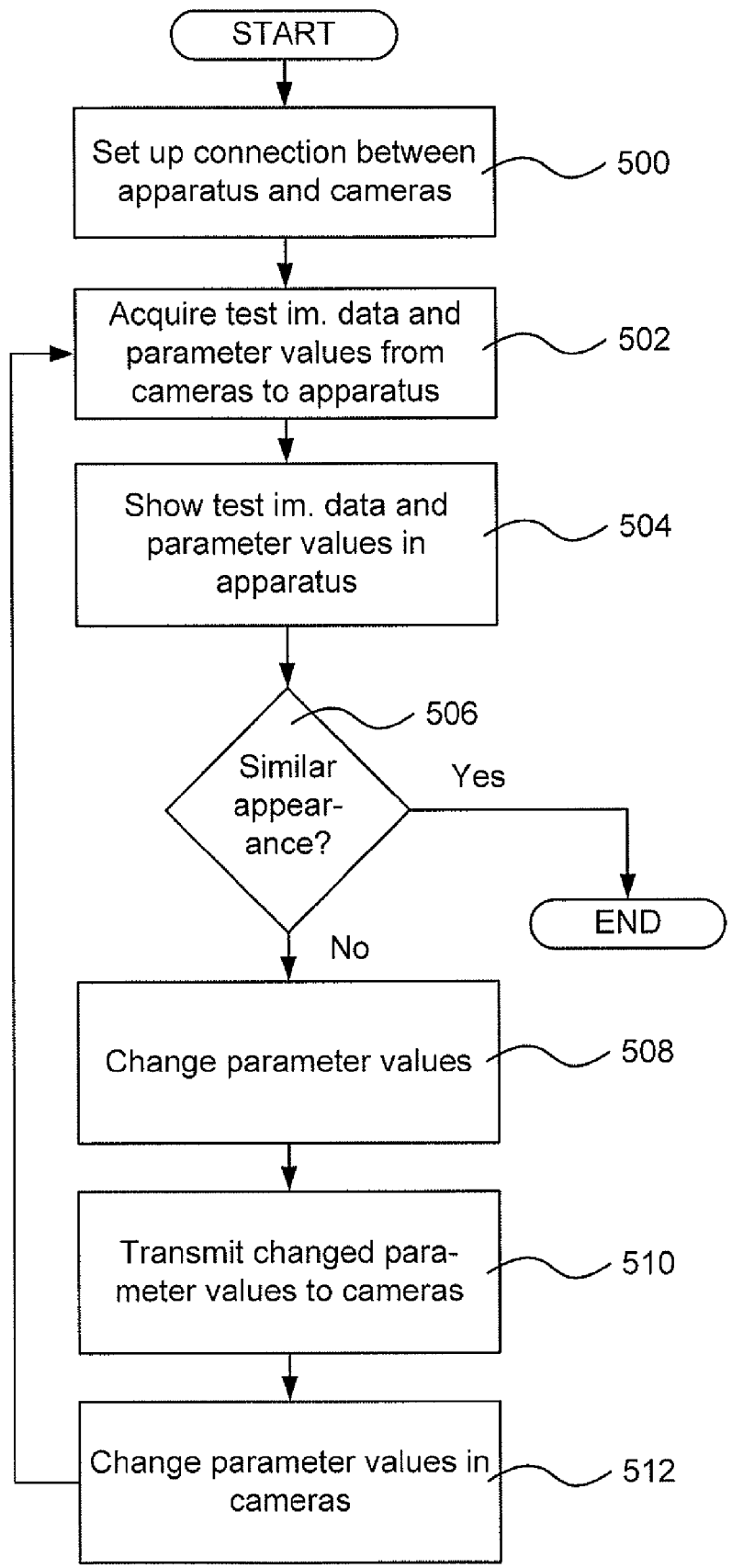
FIG. 5 illustrates a flow chart describing a general method for configuring a number of cameras.

FIG. 5 shows a flow chart illustrating the general steps of a method for configuring parameter values for a number of cameras according to the present invention, reference is also made to details of FIGS. 1 and 3.

In a first step 500, a connection is set up between the apparatus 104 and the cameras 100a-100f. This connection can be set up through the data communications network 102.

In a second step 502, test image data and parameter values are acquired by the apparatus 104 from the cameras 100a-100f.

In a third step 504, the acquired test image data and parameter values are shown on the display 300 of the apparatus 104.

In a fourth step 506, it is investigated whether the acquired image data from the cameras 100a-100f have a similar appearance, e.g. that a specific green object is represented with the same green colour in the image data from each of the cameras 100a-100f.

This fourth step 506 can be performed manually by the user of the apparatus 104. For instance, by using a GUI as is described in FIG. 4.

Alternatively, this fourth step 506 is made automatically, e.g. the apparatus determines a reference camera, and adjusts the remaining cameras in accordance with the reference camera.

This can be done by choosing reference image data originating from the reference camera, calculating a number of characteristic values for the reference image data, such as the mean red value, comparing the characteristic values of the reference image data with the corresponding characteristic values of the image data originating from one or several of the other cameras, calculating a correction value, or values, based on the comparison, and changing the parameter values in the one or several other cameras in accordance with the correction value.

If the image data from the cameras 100a-100f is considered to have a similar appearance, the parameter values are configured correctly, and conversely, if the image data from the cameras 100a-100f are not considered to have a similar appearance, the method enters a fifth step 508.

In the fifth step 508, the parameter values are changed. This can be made by choosing a template, or by configuring each of the parameter values separately.

In a sixth step 510, the updated parameter values are transmitted to the cameras 100a-100f.

Thereafter, in a seventh step 512, the parameter values of the cameras are updated in accordance with the received changed parameter values.

Next, the method is repeated from the second step 502, i.e. test image data are acquired once again, and so on, until the image data from the cameras is considered to have a similar appearance.

Since the changed parameter values are transmitted from the apparatus 104 to the cameras 100a-100f in the sixth step 510, the changed parameter values does not necessarily have to be acquired from the cameras 100a-100f when the second step 502 is repeated. However, if many users are able to change the parameter values of the cameras 100a-100f, there may be a good reason to acquire the changed parameter values.

To sum up, the method is an iterative method, which means that the steps of the method will be repeated until the user, or the apparatus, considers the image data from the cameras to have a similar appearance. Essentially, an unlimited number of iterations can be made.

Four Embodiments

FIGS. 6, 7, 8 and 9 illustrate a first, a second, a third and a fourth embodiment of the present invention, respectively. In all the embodiments, six different cameras 100a-100f are available and connected to the apparatus 104 in accordance with FIG. 1. The actual number of cameras may be less than or more than six in other embodiments.

Generally, in all of the embodiments, image data is initially received from all of the cameras 100a-100f and is shown on the display 300. Then, a first subset comprising some of the cameras is not considered to have image data with the same appearance as the image data of the remaining cameras, whereas the parameter values of the cameras included within the first subset are changed. Thereafter, changed image data is acquired from a second subset comprising at least the cameras of the first subset.

Figure 6:
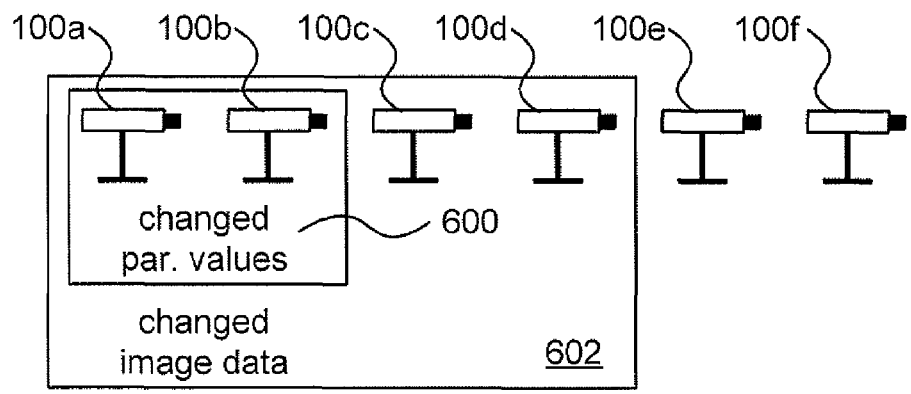
FIG. 6 illustrates a first embodiment of the present invention.

In the first embodiment, illustrated in FIG. 6, the first subset 600 comprises the cameras 100a-100b and the second subset 602 comprises the cameras 100a-100d.

By including more cameras in the second subset than in the first subset, image data from cameras with changed parameter values as well as image data from cameras with unchanged parameter values are generated at the same point of time. This implies that the conditions are improved for the decision whether the image data is similar or not.

For instance, if the cameras 100a-100d, i.e. the second subset, are monitoring a room, and a light is being lit in the room, the configuration of parameter values will not be disturbed, since all sets of image data from cameras 100a-100d are generated at the same point of time, either before the light is being lit or after the light is being lit.

The reason for not including the cameras 100e-100f in the second subset can be that the lighting conditions of the environments being monitored by the cameras 100e-100f differ strongly from the environments being monitored by the cameras 100a-100d included in the second subset 602.

For instance, the environments being monitored by the cameras 100a-100d included in the second subset 602 may be indoor environments, and the environments being monitored by the cameras 100e-100f may be environments illuminated by an IR light.

Figure 7:
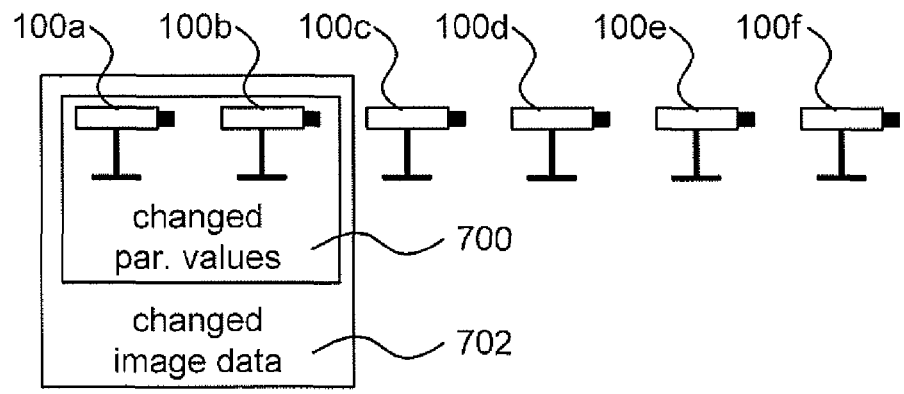
FIG. 7 illustrates a second embodiment of the present invention.

FIG. 7 illustrates the second embodiment. In this embodiment a first subset 700, as well as a second subset 702, comprises the cameras 100a-100b.

This embodiment can be relevant if the cameras 100a-100b are the only ones monitoring a certain lighting environment and none of the cameras 100a-100b have proper parameter values.

Figure 8:
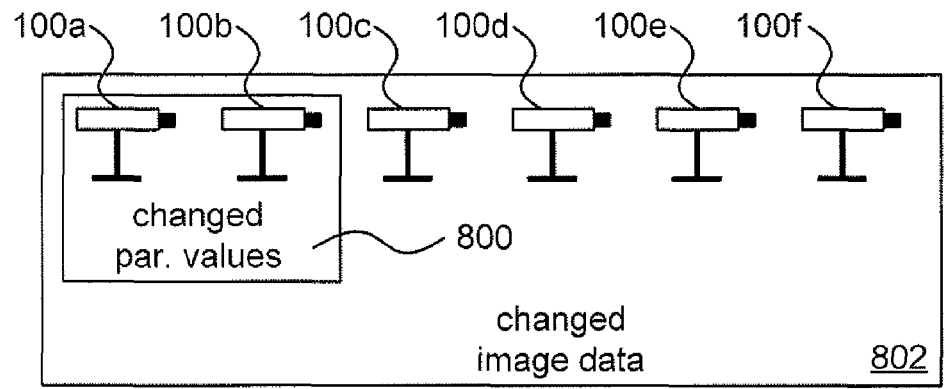
FIG. 8 illustrates a third embodiment of the present invention.

FIG. 8 illustrates a third embodiment. In this embodiment, a first subset 800 comprises the cameras 100a-100b and a second subset 802 comprises all of the cameras 100a-100f.

This embodiment can be relevant if all of the cameras are monitoring environments with the same lighting conditions and the cameras 100a-100b are the only ones not having proper parameter values.

Figure 9:
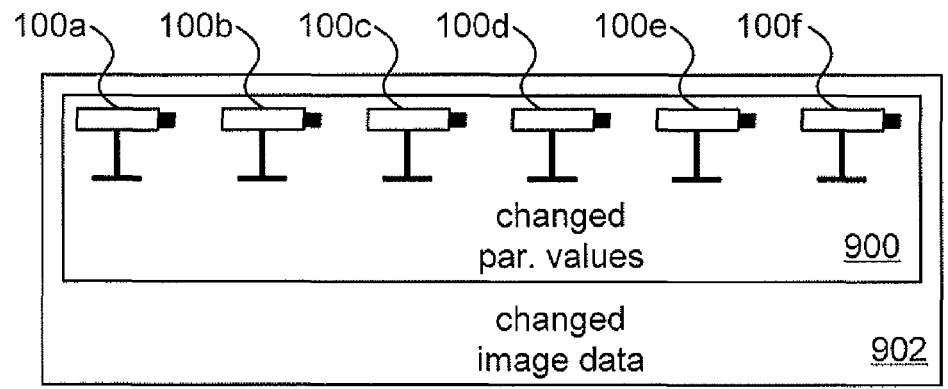
FIG. 9 illustrates a fourth embodiment of the present invention.

FIG. 9 illustrates a fourth embodiment. In this embodiment, a first subset 900, as well as a second subset 902, comprises all of the cameras 100a-100f.

If all of the cameras are not having proper parameter values, this embodiment can be relevant.

An advantage of having the first subset 600/700/800/900 and the second subset 602/702/802/902, respectively, is that only the required image data is transmitted from the cameras 100a-100f to the apparatus 104 during the configuration of parameter values. This implies less unnecessary usage of the datacommunications network 102.

If the present invention is realised as a computer program, it can be made in such a way that it is possible for the user to determine the first and second subset easily. For instance, this can be realised by having checkboxes 422a, 422b, 422c, 422d associated to each of the cameras 100a-100d, which checkbox indicates whether each camera is associated to the second subset 602/702/802/902 or not. If the parameter values for a camera is changed, the camera can be automatically associated to the first subset 600/700/800/900, as well as the second subset 602/702/802/902.

A Method for Configuring Parameter Values

Figure 10:
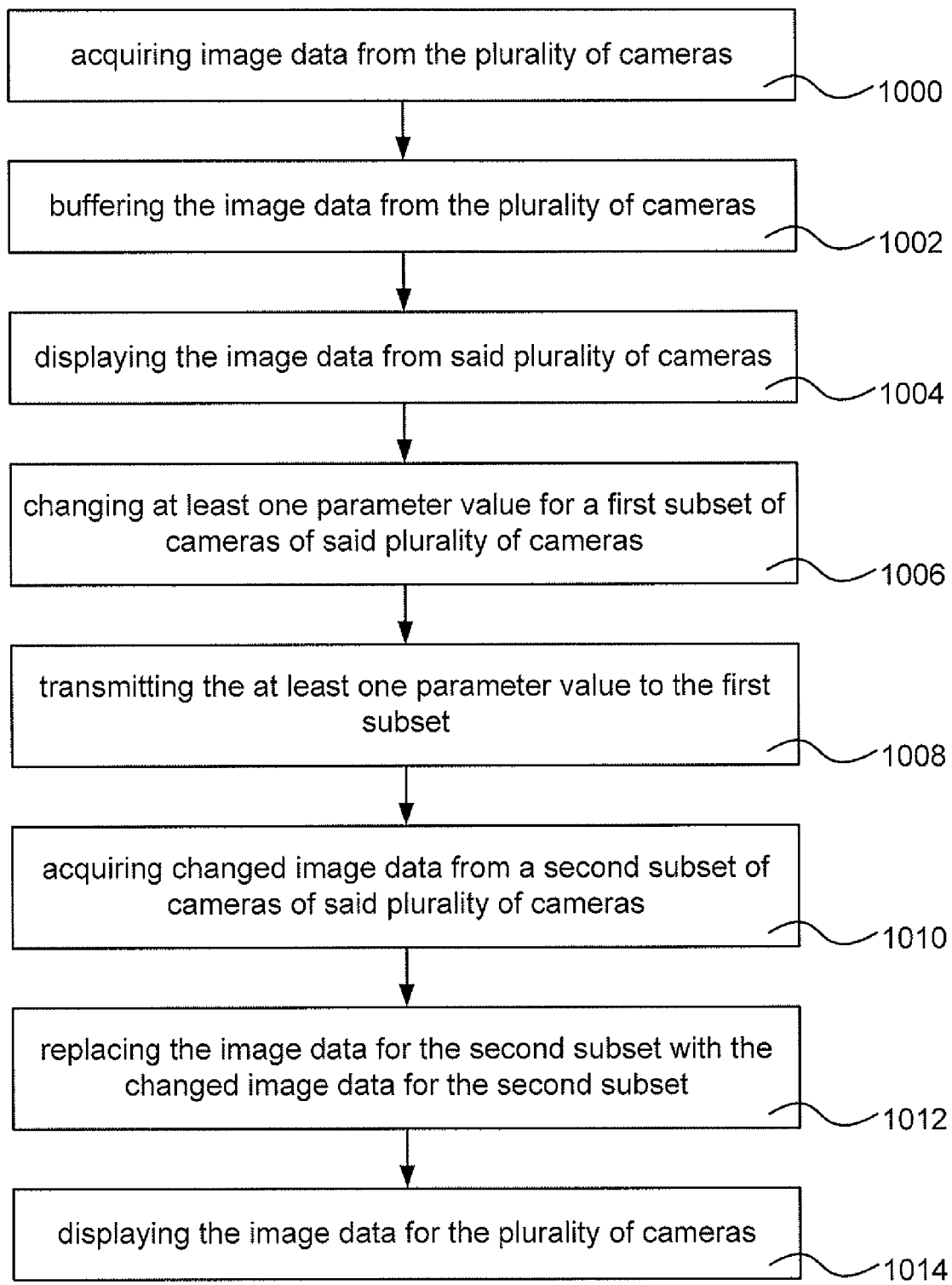
FIG. 10 illustrates a method for configuring parameter values.

According to another aspect, the method for configuring parameter values for a plurality of cameras may be described with reference to FIG. 10. The steps of this method may be performed in the apparatus 104.

In a first step 1000, image data is acquired from the plurality of cameras 100a-100f.

In a second step 1002, the image data is buffered.

In a third step 1004, the image data is displayed.

In a fourth step 1006, at least one parameter value is changed for a first subset of cameras 600/700/800/900.

In a fifth step 1008, the at least one parameter value is transmitted to the first subset of cameras 600/700/800/900.

In a sixth step 1010, changed image data is acquired from a second subset of cameras 602/702/802/902.

In a seventh step 1012, the buffered image data for the second subset of cameras 602/702/802/902 is replaced with the changed image data for the second subset of cameras 602/702/802/902.

Finally, in an eighth step 1014, the image data for the plurality of cameras 100a-100f is displayed.

A Method for Parameter Configuration of a Camera

Figure 11:
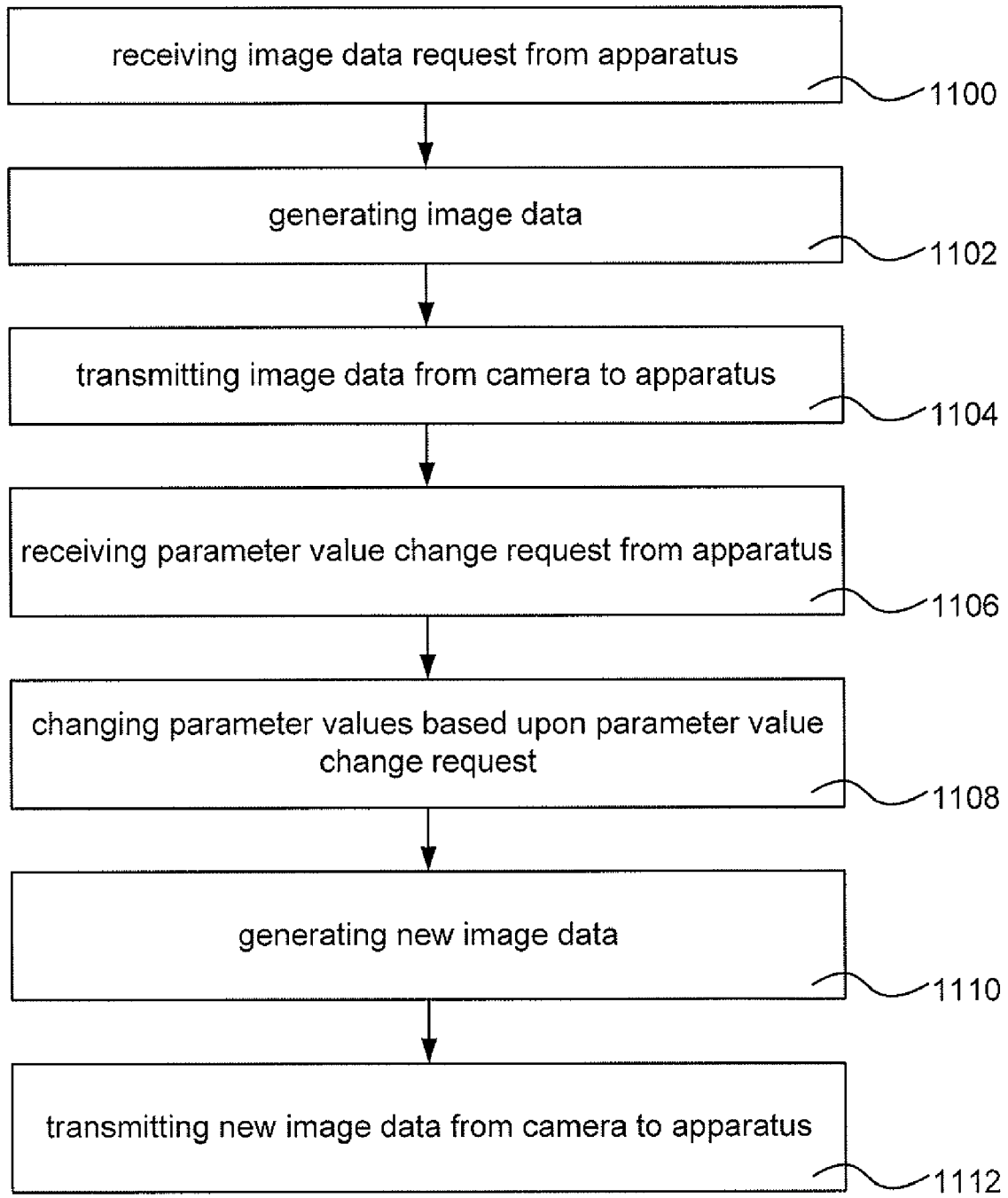
FIG. 11 illustrates a method for parameter configuration of a camera.

A method for parameter value configuration of a camera 100 coupled to an apparatus 104 through a data communications network 102 will now be described with reference to FIG. 11. The steps of this method will be performed in the camera.

In a first step 1100, an image data request from the apparatus 104 is received by the camera 100.

In a second step 1102, image data is generated by the camera 100.

In a third step 1104, the image data is transmitted from the camera 100 to the apparatus 104.

In a fourth step 1106, a parameter value change request from the apparatus 104 is received by the camera 100.

In a fifth step 1108, the parameter values are changed based upon the parameter value change request.

In a sixth step 1110, new image data based on the changed parameter values is generated by the camera 100.

Finally, in a seventh step 1112, the new image data is transmitted to the apparatus 104 through the data communications network 102.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method for configuring parameter values for a plurality of cameras, comprising:
    acquiring image data from said plurality of cameras, said cameras storing parameter values which control the appearance of image data captured by said cameras, wherein at least one of said parameter values is selected from a group consisting of: a white balance value, a contrast value, a compression value, a sharpness value, and a color balance value,
    buffering said image data from said plurality of cameras,
    displaying said buffered image data from said plurality of cameras simultaneously as separate images from at least two of the plurality of cameras,
    comparing the appearance of the displayed separate images to each other in order to identify a first subset of said plurality of cameras, wherein the image data corresponding to the cameras of said first subset are determined to have a dissimilar appearance in respect of said parameter values compared to the image data of the remaining cameras,
    changing at least one parameter value for said first subset of said plurality of cameras, wherein the changing is made by choosing a template, wherein the template comprises a set of predetermined parameter values for a certain environment,
    transmitting said set of predetermined parameter values to said first subset of cameras to allow update of each camera in accordance with said set of predetermined parameter values,
    acquiring image data from a second subset of said plurality of cameras comprising at least the cameras of the first subset, where the second subset consists of cameras with updated images,
    replacing said buffered image data for said second subset of cameras with said acquired image data for said second subset of cameras, and
    displaying feedback of the updated images on the display including said acquired image data for said second subset of cameras simultaneously as separate images from at least two of the plurality of cameras.

2. A method according to claim 1, wherein said first subset is a subset of said second subset.

3. A method according to claim 1, wherein said first subset is equal to said second subset.

4. A method according to claim 2, wherein said second subset is equal to said plurality of cameras.

5. A method according to claim 1, wherein said changing involves
    receiving a user input from a user, and
    changing said at least one parameter value in accordance with said user input.

6. A method according to claim 1, wherein said changing involves
    determining reference image data,
    calculating a correction value based on said reference image data, and
    changing said at least one parameter value in accordance with said correction value.

7. A method according to claim 1, wherein said acquiring of image data involves transmitting an image data request to said plurality of cameras.

8. A method according to claim 1, wherein said step of changing involves receiving a user input from a user, and wherein the step of choosing a template is performed based on said user input.

9. A method according to claim 8, wherein said set of predetermined parameter values is selected from a group consisting of: a set of predetermined parameter values adapted for outdoor conditions, a set of predetermined parameter values adapted for indoor conditions, a set of predetermined parameter values adapted for fluorescent lighting conditions, a set of predetermined parameter values adapted for incandescent light conditions and a set of predetermined parameter values adapted for infrared light conditions.

10. A method according to claim 1, wherein said parameter values are acquired together with said image data from said plurality of cameras in said acquiring of image data and are displayed in said displaying of image data together with said image data.

11. A method according to claim 1, wherein said acquiring of said image data, buffering of said image data, displaying of said image data, changing of at least one parameter value for said first subset, transmitting of said at least one parameter value, acquiring of changed image data from said second subset, replacing of said buffered image data for said second subset, and displaying of said buffered image data, are repeated iteratively until a user acceptance signal is received from a user.

12. A non-transitory computer readable medium having a stored computer program code that when executed, performs the steps of the method according to claim 1.

13. An apparatus comprising:
a processing device, an input device,
a memory adapted for holding a number of parameter values and for buffering image data,
a data communication interface adapted for communication through a data communications network with a plurality of cameras, and
a display adapted for showing image data from the plurality of cameras simultaneously as separate images from at least two of the plurality of cameras, said parameter values relating to the appearance of said image data and at least one of said parameter values being selected from a group consisting of: a white balance value, a contrast value, a compression value, a sharpness value, and a color balance value,
wherein the processing device is adapted to:
acquire image data from said plurality of cameras,
buffer said image data from said plurality of cameras in said memory,
display said buffered image data from said plurality of cameras on said display,
compare the appearance of the displayed separate images to each other in order to identify a first subset of said plurality of cameras, wherein the image data corresponding to the cameras of said first subset are determined to have a dissimilar appearance in respect of said parameter values compared to the image data of the remaining cameras,
change at least one parameter value for said first subset of said plurality of cameras based upon an actuation of said input device, wherein said actuation comprises a template, wherein the template comprises a set of predetermined parameter values for a certain environment,
transmit said set of predetermined parameter values to said first subset of cameras through said data communications network, to allow update of each camera in said first subset in accordance with said set of predetermined parameter values,
acquire image data from a second subset of said plurality of cameras through said data communications network, where the second subset consists of cameras with updated images,
replace said buffered image data for said second subset of cameras with said acquired image data for said second subset of cameras in said memory, and
display said feedback of the updated images on the display including acquired image data for said second subset of cameras simultaneously on said display as separate images from at least two of the plurality of cameras.

14. An apparatus according to claim 13, wherein said apparatus comprises a personal computer (PC).

15. An apparatus according to claim 13, wherein said apparatus comprises a mobile terminal.

16. A system for configuration of at least one parameter value in a plurality of cameras, comprising:

a data communications network,
a plurality of cameras,
an apparatus connected to said data communications network, said apparatus comprising:
a processing device,
an input device,
a memory adapted for holding a number of parameter values and for buffering image data,
a data communication interface adapted for communication through a data communications network with the plurality of cameras, and
a display adapted for showing image data from the plurality of cameras simultaneously as separate images from at least two of the plurality of cameras, said parameter values relating to the appearance of said image data and at least one of said parameter values being selected from a group consisting of: a white balance value, a contrast value, a compression value, a sharpness value, and a color balance value,
wherein the processing device is adapted to
acquire image data from said plurality of cameras,
buffer said image data from said plurality of cameras in said memory,
display said buffered image data from said plurality of cameras on said display simultaneously as separate images from at least two of the plurality of cameras,
compare the appearance of the displayed separate images to each other in order to identify a first subset of said plurality of cameras, wherein the image data corresponding to the cameras of said first subset are determined to have a dissimilar appearance in respect of said parameter values compared to the image data of the remaining cameras,
change at least one parameter value for said first subset of said plurality of cameras based upon an actuation of said input device, wherein said actuation of said input device comprises choosing a template, wherein the template comprises a set of predetermined parameter values for a certain environment,
transmit said set of predetermined parameter values to said first subset of cameras through said data communications network, to allow update of each camera in accordance with said set of predetermined parameter values,
acquire image data from a second subset of said plurality of cameras through said data communications network, where the second subset consists of cameras with updated images,
replace said buffered image data for said second subset of cameras with said acquired image data for said second subset of cameras in said memory, and
display feedback of the updated images on the display including said acquired image data for said second subset of cameras simultaneously on said display as separate images from at least two of the plurality of cameras, and
wherein said plurality of cameras is configured for communication with said apparatus through said data communications network.

17. An apparatus comprising:
a processing device,
an input device,
a graphical user interface,
a memory adapted for holding a number of parameter values and for buffering image data, a data communication interface adapted for communication through a data communications network with a plurality of cameras, and a display adapted for showing image data from the plurality of cameras simultaneously as separate images from at least two of the plurality of cameras, said parameter values relating to the appearance of said image data and at least one of said parameter values being selected from a group consisting of: a white balance value, a contrast value, a compression value, a sharpness value, and a color balance value, wherein the processing device is adapted to acquire image data from said plurality of cameras, buffer said image data from said plurality of cameras in said memory, display said buffered image data from said plurality of cameras on said display, receive user input via said graphical user interface, the input is defining a first subset of said plurality of cameras wherein the appearance on the display of the displayed separate images relating to said defined first subset of said plurality of cameras differs from the appearance on the display of the displayed separate images relating to cameras not included in said first subset in respect of said parameter values, wherein the user input comprises a template comprising a set of predetermined parameter values for a certain environment, change at least one parameter value for the first subset of said plurality of cameras based upon the received user input from said input device in relation to said graphical user interface, transmit said at least one parameter value to said first subset of camera through said data communications network, to allow update of said at least one parameter value in each camera in said first subset, acquire changed image data from a second subset of said plurality of cameras through said data communications network, where the second subset consists of cameras with updated images replace said buffered image data for said second subset of cameras with said changed image data for said second subset of cameras in said memory, and display feedback of the updated images on the display including said acquired image data for said second subset of cameras simultaneously on said display as separate images from at least two of the plurality of cameras.

18. A system for configuration of at least one parameter value in a plurality of cameras, comprising:
a data communications network,
a plurality of cameras,
an apparatus connected to said data communications network, said apparatus comprising:

a processing device,
an input device, a graphical user interface,
a memory adapted for holding a number of parameter values and for buffering image data,
a data communication interface adapted for communication through a data communications network with a plurality of cameras, and
a display adapted for showing image data from the plurality of cameras simultaneously as separate images from at least two of the plurality of cameras, said parameter values relating to the appearance of said image data and at least one of said parameter values being selected from a group consisting of: a white balance value, a contrast value, a compression value, a sharpness value, and a color balance value, wherein the processing device is adapted to
acquire image data from said plurality of cameras,
buffer said image data from said plurality of cameras in said memory,
display said buffered image data from said plurality of cameras on said display,
receive user input via said graphical user interface, the input is defining a first subset of said plurality of cameras wherein the appearance on the display of the displayed separate images relating to said defined first subset of said plurality of cameras differs from the appearance on the display of the displayed separate images relating to cameras not included in said first subset in respect of said parameter values,
wherein the user input comprises a template comprising a set of predetermined parameter values for a certain environment,
change at least one parameter value for the first subset of said plurality of cameras based upon the received user input from said input device in relation to said graphical user interface,
transmit said at least one parameter value to said first subset of cameras through said data communications network, to allow update of said at least one parameter value in each camera in said first subset,
acquire changed image data from a second subset of said plurality of cameras through said data communications network, where the second subset consists of cameras with updated images,
replace said buffered image data for said second subset of cameras with said changed image data for said second subset of cameras in said memory, and
display feedback of the updated images on the display including said acquired image data for said second subset of cameras simultaneously on said display as separate images from at least two of the plurality of cameras, and
wherein said a plurality of cameras is configured for communication with said apparatus through said data communications network.

* * * * *